(12) United States Patent
Hsu et al.

(10) Patent No.: US 8,514,143 B2
(45) Date of Patent: Aug. 20, 2013

(54) ELECTRONIC DEVICE WITH ANTENNA SWITCH AND ANTENNA SWITCHING METHOD THEREOF

(75) Inventors: Cho-Kang Hsu, Taipei County (TW); Chia-Hung Su, Taipei County (TW)

(73) Assignee: Chi Mei Communication Systems, Inc., New Taipei (TW)

(*) Notice: Subject to any disclaimer, the term of this patent is extended or adjusted under 35 U.S.C. 154(b) by 392 days.

(21) Appl. No.: 12/965,429

(22) Filed: Dec. 10, 2010

(65) Prior Publication Data
US 2011/0298674 A1    Dec. 8, 2011

(30) Foreign Application Priority Data
Jun. 2, 2010    (TW) .............................. 099117768 A

(51) Int. Cl.
*H01Q 3/24*    (2006.01)
(52) U.S. Cl.
USPC ............ 343/876; 343/702; 455/101; 375/267

(58) Field of Classification Search
USPC ................... 343/702, 876; 455/277.1, 277.2, 455/101; 375/267, 347
See application file for complete search history.

(56) References Cited

U.S. PATENT DOCUMENTS

| | | | | |
|---|---|---|---|---|
| 6,154,177 A * | 11/2000 | Saito et al. | ..................... | 343/702 |
| 6,907,094 B2 * | 6/2005 | Matsui et al. | ................. | 375/347 |
| 7,535,971 B2 * | 5/2009 | Yen et al. | ....................... | 375/267 |
| 8,159,399 B2 * | 4/2012 | Dorsey et al. | ................. | 343/702 |
| 8,208,886 B2 * | 6/2012 | Baker | ....................... | 455/277.1 |

\* cited by examiner

*Primary Examiner* — Tan Ho
(74) *Attorney, Agent, or Firm* — Altis Law Group, Inc.

(57) ABSTRACT

An electronic device with antenna switch comprises a first antenna, a first proximity sensor, a second antenna, a detection module, a determination module and a control module. The first proximity sensor is located with the first antenna at a first side portion of the electronic device. The detection module detects an approach signal from the first proximity sensor. The determination module determines whether the strength of the approach signal is stronger than a threshold value in real time. The control module initiate the second antenna to receive signals through the switch if the strength of the approach signal is stronger then the strength of the threshold value.

10 Claims, 2 Drawing Sheets

ELECTRONIC DEVICE WITH ANTENNA SWITCH AND ANTENNA SWITCHING METHOD THEREOF

CROSS-REFERENCE TO RELATED APPLICATION

This application is related to co-pending U.S. patent application Ser. No. 12/960,627, entitled "ELECTRONIC DEVICE WITH MULTIPLE ANTENNAS AND ANTENNA OPERATION METHOD THEREO", by Chien-Chang Liu, Chung-Yu Huang and Kun-Lin Sung, which has the same assignee as the present application. The above-identified application is incorporated herein by reference.

BACKGROUND

1. Technical Field

The present disclosure relates to an electronic device with multiple antennas, and more particularly to an electronic device with multiple antennas optimizing antenna efficiency through a proximity sensor.

2. Description of Related Art

Portable devices, such as NetBook, often include multiple antennas to receive all kind of signals from different frequency channels. However, antennas receivers may generate massive electromagnetic waves. Therefore, there is room for improvement within the art.

DETAILED DESCRIPTION

In general, the word "module" as used herein, refers to logic embodied in hardware or firmware, or to a collection of software instructions, written in a programming language, such as, for example, Java, C, or assembly. One or more software instructions in the unit may be integrated in firmware, such as an EPROM. It will be appreciated that module may comprise connected logic units, such as gates and flip-flops, and may comprise programmable units, such as programmable gate arrays or processors. The unit described herein may be implemented as either software and/or hardware unit and may be stored in any type of computer-readable medium or other computer storage device.

Figure 1:
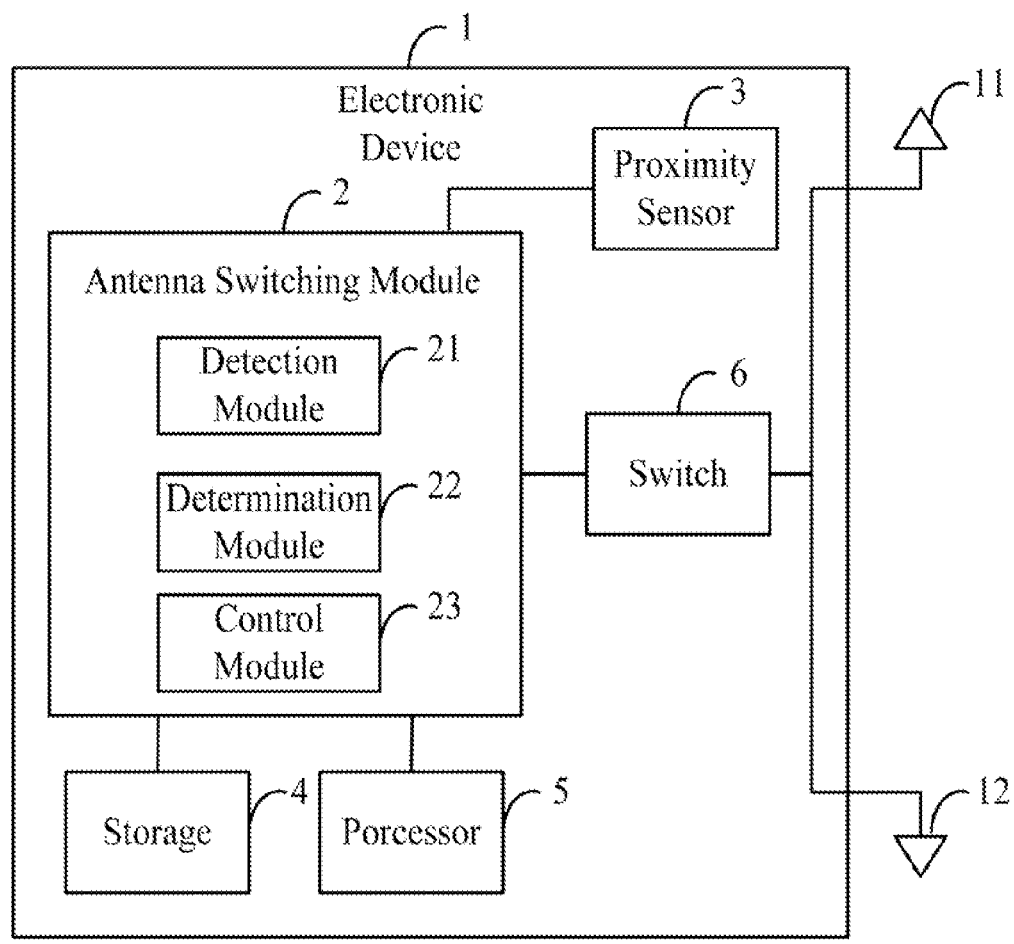
FIG. 1 is the block diagram of an exemplary embodiment of an electronic device with an antenna switch of the present disclosure.

FIG. 1 is the block diagram of an exemplary embodiment of an electronic device with an antenna switch of the present disclosure. The electronic device 1 includes an antenna switching module 2, a proximity sensor 3, a storage 4, a processor 5, a switch 6, a first antenna 11 and a second antenna 12. In an exemplary embodiment, the antenna switching module 2 is stored in the storage 4. The processor 5 controls the antenna switching module 2, the proximity sensor 3, the storage 4, the switch 6, the first antenna 11 and the second antenna 12 to execute the functions described below. In an exemplary embodiment, the electronic device 1 is a notebook, cell phone, e-book reader or a personal digital assistor (PDA).

The electronic device 1 is generally controlled and coordinated by an operating system, such as UNIX, Linux, Windows, Mac OS, an embedded operating system, or any other compatible system. Alternatively, the broadcast server 1 may be controlled by a proprietary operating system. Typical operating systems control and schedule computer processes for execution, perform memory management, provide file system, networking, and I/O services, and provide a user interface, such as a graphical user interface (GUI), among other tasks.

In an exemplary embodiment, the proximity sensor 3 is an optical sensor, magnetic sensor or a capacitance sensor. The proximity sensor detects whether an object, such as a user, is approaching. The proximity sensors send an approach signal to the processor 5. The strength of the approach signal presents how close a user is to the electronic device 1 in real time. The approach signal can be an analog signal representing a real distance between the user and the electronic device 1. In other exemplary embodiments, the approach signal can be a digital signal representing a scaled distance between the user and the electronic device 1.

The first antenna 11 and the proximity sensor 3 are both located at a first portion of the electronic device 1. The second antenna 12 is located at a second portion of the electronic device away from the proximity sensor 3. In an exemplary embodiment, the first portion is the top portion of the electronic device 1. The second antenna 12 is located at the side portion of the electronic device 1.

The antenna switch module 2 includes a detection module 21, a determination module 22 and a control module 23. The detection module 21 detects a first approach signal from the proximity sensor 3. In an exemplary embodiment, the processor 5 predefines the first antenna 11 as a silent antenna. When the proximity sensor 3 receives no approach signal, the control module 23 initiates the silent antenna. The determination module 22 determines whether a user is approaching the proximity sensor 3 through the variance of the strength of the approach signal. In an exemplary embodiment, the determination module 22 compares the strength of the approach signal with a threshold value. When the strength of the approach signal is stronger than the threshold, the control module 23 controls the switch 6 to turn off the first antenna 11 and initiate the second antenna 12 to receive signal. When the strength of the approach signal is weaker than the threshold, the control module 23 controls the switch to leave the first antenna 11 to receive signals. It should be noted that the switch 6 is capable of switching among more than two antennas under control of the control module 23.

Figure 2:
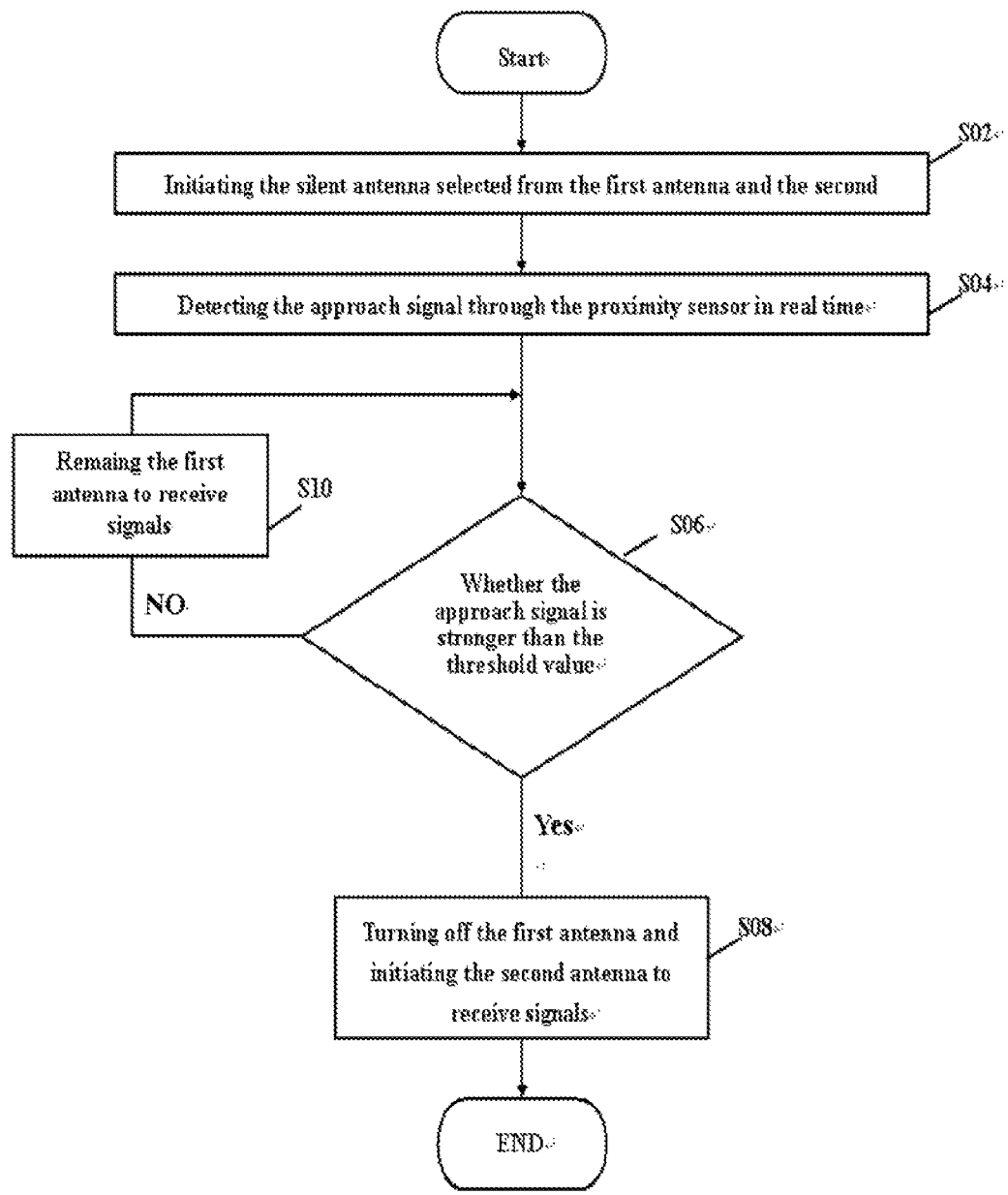
FIG. 2 is a flowchart of an exemplary embodiment of an antenna switch method of the present disclosure.

FIG. 2 is a flowchart of an exemplary embodiment of an antenna switching method of the present disclosure. In the block S02, the processor 5 initiates the silent antenna selected from the first antenna 11 and the second antenna 12. In one exemplary embodiment, the first antenna 11 is predefined as the silent antenna.

In the block S04, the detection module 21 detects the approach signal through the proximity sensor 3 in real time. In the one exemplary, the approach signal can be an analog signal representing a real distance between the user and the electronic device 1. In the other exemplary embodiment, the approach signal can be a digital signal representing a scaled distance between the user and the electronic device 1 under scale degree.

In the block S06, the determination module 22 determines whether the approach signal is stronger than the threshold value.

In the block S08, when the strength of the approach signal is stronger than the threshold value, the control module 23 controls the switch 6 to turn off the silent antenna and initiate the other antenna to receive signals.

In the block S10. When the strength of the approach signal is weak than the threshold, the control module 23 controls the switch to remain the first antenna 11 to receive signals.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device with antenna switch, comprising:
   a first antenna that is predefined as a silent antenna to receive a signal;
   a first proximity sensor that is located with the first antenna at a first side portion of the electronic device;
   a second antenna that is located at a second portion of the electronic device away from the first portion;
   a detection module that detects an approach signal from the first proximity sensor;
   a determination module that determines whether the strength of the approach signal is stronger than a threshold value in real time;
   a control module that initiate the second antenna to receive signals if the strength of the approach signal is stronger then the strength of the threshold value; and
   a processor that controls the detection module, the determination module and the control module.

2. The electronic device of claim 1, further comprising:
   a switch that switches off the first antenna and initiates the second antenna when strength of the approach signal is stronger than the threshold value.

3. The electronic device of claim 1, wherein the detection module that detects an approach signal from the first proximity sensor in real time.

4. The electronic device of claim 1, wherein the strength of the approach signal is an analog signal representing a real distance between a user and the electronic device.

5. The electronic device of claim 1, wherein the strength of the approach signal is a digital signal representing a scaled distance between a user and the electronic device.

6. An antenna switching method of an electronic device with an antenna switch, comprising:
   initiating a first antenna as a silent antenna to receive signals;
   detecting an approach signal from a proximity sensor locating with the first antenna at a first side portion of the electronic device;
   detecting whether the strength of the approach signal is stronger than a threshold value in real time; and
   initiating a second antenna to receive the signals when the strength of the approach signal is stronger than the threshold value, wherein the second antenna is located at a second portion of the electronic device away from the first portion.

7. The antenna switching method of claim 6, further comprising:
   turning off the first antenna when the strength of the approach signal is stronger than the threshold value.

8. The antenna switching method of claim 6, further comprising:
   remaining the first antenna to receive the signal when the strength of the approach signal is weaker than the threshold value.

9. The antenna switching method of claim 6, wherein the strength of the approach signal is an analog signal representing a real distance between a user and the electronic device.

10. The antenna switching method of claim 6, wherein the strength of the approach signal is a digital signal representing a scaled distance between a user and the electronic device.

* * * * *